Figure 1:
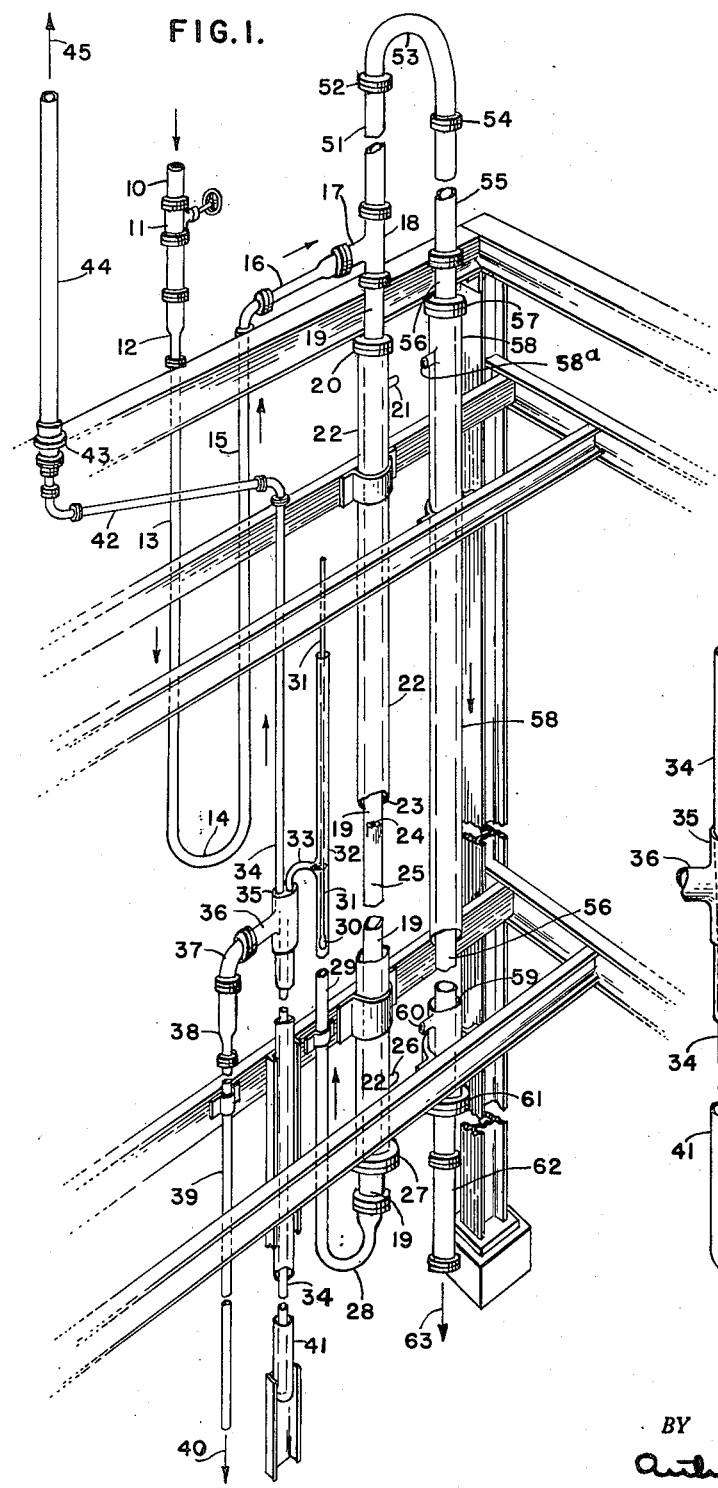

Jan. 15, 1946. J. C. PERNERT 2,392,862
DISTILLATION
Filed Aug. 10, 1943

INVENTOR.
JOHN C. PERNERT,
BY Arthur Middleton
ATTORNEY

Patented Jan. 15, 1946

2,392,862

UNITED STATES PATENT OFFICE 2,392,862

DISTILLATION

John C. Pernert, Niagara Falls, N. Y., assignor to Oldbury Electro-Chemical Co., Niagara Falls, N. Y., a corporation of New York Application August 10, 1943, Serial No. 498,065

5 Claims. (Cl. 202—39)

This invention relates to the recovery of a concentrated solution of hydrochloric acid (HCl) from complex solutions thereof which have the property of selectively evolving HCl when heated or distilled, and the invention comprises method and apparatus for so-doing. The apparatus has usefulness in the concentration of other solutions, as will appear hereinafter.

An object of the invention is to devise such a method and apparatus wherein the operation thereof is continuous, and wherein the degree of concentration of the yielded product is controllable accurately by the rate of starting solution fed to the apparatus.

The apparatus is characterized by a boiler or vaporizer section, preferably vertical, wherein a body of liquid being treated is continuously maintained extending into the boiler section and having its liquid level well within that section, and vapors from the boiler section are conducted into a condenser section, preferably vertical, from which they discharge continuously as distillate and comprise yielded concentrated solution while the non-vaporized constituents of the starting liquid are continuously drawn off from the body of liquid that extends into the boiler section.

This apparatus when used to treat a complex aqueous solution containing HCl has the starting solution supplied to the boiler section which is maintained at a temperature above that at which HCl vaporizes. The heat vaporizes HCl and a part of the water present, whereupon vapors thereof rise and pass into the condenser section where they are condensed and from which they discharge as concentrated HCl solution. The non-volatilized constituents of the starting solution are rejected and collect in the body of liquid maintained in the vaporizer or boiler section, from which body of liquid they are withdrawn to discharge. This distillation is based upon the phenomenon of selective volatilization, for example whereby HCl volatilizes or vaporizes out of appropriate complex solutions while leaving behind a major part of the water and other unvaporized components of the solution. The degree of concentration of the yielded HCl distillate (that is, the ratio of HCl to H₂O), is found to be controlled by the rate of feed of the starting solution to the apparatus.

This apparatus and method find utility as one step in the making of perchloric acid, as described in my patent application, Ser. No. 487,498, filed May 18, 1943, and indeed they also find utility in other distillation processes where a significant constituent of a dilute or mixed solution is selectively distillable from such solution.

Figure 2:
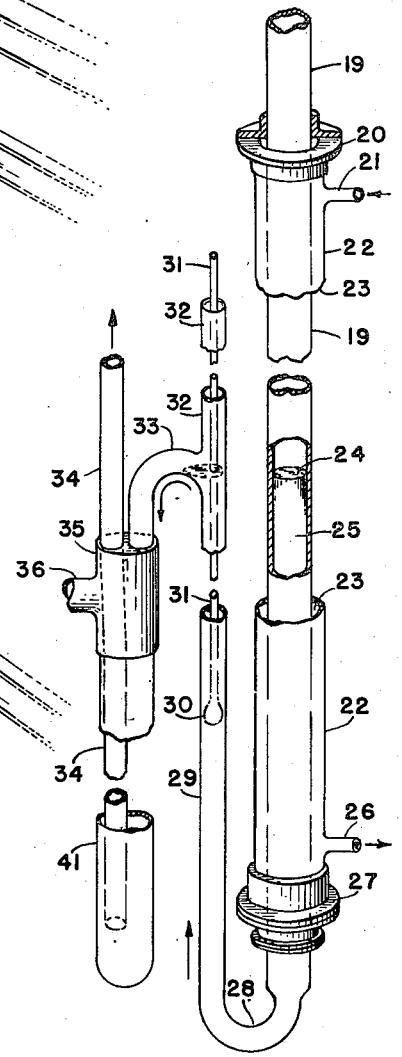

An embodiment of this invention has been chosen for the purpose of illustration. The preferred embodiment now known to me is used, but it is not to be taken as limiting for the invention is capable of other embodiments, both generally and as to specific details of construction, as can be determined from the appended claims. The preferred embodiment is illustrated in the accompanying drawing in which Figure 1 is an isometric view thereof with parts broken away to show the interior construction, and a partial framework is shown for supporting the apparatus. Fig. 2 is an enlarged partial detailed view.

In the drawing, the numeral 10 indicates a pipe through which the starting solution is fed to the apparatus. 11 indicates a valve or other means for controlling the rate of feed of the solution to the apparatus, 12 indicates a reducer or funnel-like fitting in the pipe 10 which leads to a U-tube comprising a down leg 13, a U-section 14 and an up section 15 leading to a liquid level controlling high point comprising section 16 connected to a T-fitting having a horizontal branch 17 and a vertical branch 18. Depending from the vertical branch 18 is a boiler pipe 19 surrounded by a casing or jacket 22 secured to the pipe 19 by an upper steam tight joint 20 and a lower steam tight joint 27. 23 indicates a steam space provided between the pipe 19 and its jacket 22 to which steam is supplied through upper nipple 21 and discharged through lower nipple 26. The lower end of the pipe 19 merges into a tube 29 through a U-section 28. About midway of its length, the tube 29 is provided with a goose-neck 33 that leads to a fitting of T 35 secured to an enlarged test-tube like element 41. The fitting 35 has a horizontal branch 36 leading to an elbow 37 from which depends a reducer 38 leading to a pipe 39 from which non-volatilized liquid 40 discharges. Projecting from the upper open end of the tube 29 is a stem 31 which extends into the tube to a point below the goose-neck 33 where it terminates in a bulb 30. Extending into the test-tube 41 through the fitting 35 is a conduit 34 which rises through a high section 42 secured by a fitting 43 to an upwardly extending pipe 44 through which non-volatilized liquid discharges at 45.

From the fitting 18 above the boiler pipe 19 is a vertical extension 51 having a coupling 52 secured to a goose-neck 53 leading through a coupling 54 to a downwardly disposed pipe 55 coupled to a condenser pipe 56. Surrounding this condenser pipe 56 is a casing or jacket 58 providing between it and the pipe 56 a cooling liquid circulating space 59 sealed by an upper water-tight joint 57 and a lower water-tight joint 61. Cooling water is supplied to the space 59 through a lower nipple 60 and is discharged through an upper nipple 58a. Condenser pipe 56, which provides a condensing zone, terminates in a depending section 62 from which discharges concentrated solution 63 which is the end product of the treatment afforded by the apparatus, and which can be collected as desired.

In the boiler pipe 19, there is maintained a body of liquid 25 which extends from a liquid level 24 in the vaporizer zone of pipe 19 to the goose-neck 33 extending laterally from tube 29, the elevation of the goose-neck determining the height of the liquid level 24. The framework and fittings used for supporting the apparatus remain un-numbered since they form no part of this invention.

Using a complex dilute solution of HCl which has the property of selectively evolving HCl when heated, for example a solution containing HCl, $H_2O$ and $HClO_4$, its operation is as follows: The dilute complex solution is supplied to the apparatus through the pipe 10 at a rate controlled by any suitable means, such as the valve 11. The section of pipe between the valve 11 and the funnel-like fitting 12 can be made of glass whereby the quantity of liquid being fed can be observed, or indeed that pipe section can be omitted so that the liquid drops through the air from valve 11 to funnel 12. The liquid fills the U-tube with its legs 13 and 15 and U-connection 14, which assembly provides a liquid filled seal for preventing escape of vapor from the vaporizing zone of pipe 19. As further liquid is supplied, the liquid rises through the high section 16 and the T fitting into the pipe 19, thus at an elevation above the vaporizer zone of pipe 19. Some liquid at least, falls down boiler pipe 19 to collect in the liquid body 25 therein. Steam, or other suitable heating medium, is supplied through upper nipple 21 of the jacket 22 to heat the boiler pipe or the jacketed boiler section of pipe 19 to a temperature at which HCl and some $H_2O$ selectively volatilize from the non-volatilized contaminant comprising in this case $HClO_4$ and $H_2O$. The contaminant-bearing body of liquid 25 has its liquid level maintained well within the boiler section of pipe 19 by being balanced through the medium of a balancing liquid column in tube 29 whose upper level is fixed by a level-controlling high point comprised by the overflow gooseneck 33. Contaminant-bearing liquid is continuously overflowed from the boiler or vaporization zone of pipe 19 through the gooseneck 33 to discharge or to further treatment, as the case may be.

HCl and that part of the $H_2O$ volatilized from the body of liquid 25 in the boiler or vaporizer zone of pipe 19 rise as vapor upwardly through pipe 19, fitting 18, extension 51, over the gooseneck 53 and downwardly through pipe 56 through the condenser zone thereof within the jacket 58 that is cooled below the condensation point HCl, whereupon the HCl condenses as distillate and discharges at 63 from its depending section 62 as distillate solution having a controlled degree of HCl concentration.

If the contaminated solution discharging from the gooseneck 33 is to be discarded, that would be the terminal point of the apparatus, but if such substantially HCl-free solution is suitable for further treatment, for example as in the making of perchloric acid, the remainder of the apparatus shown can be used. That is, liquid discharged over the gooseneck 33 is collected in the enlarged test-tube 41 from which it is pumped or otherwise sucked upwardly through conduit 34 and its high section 42 including the upward extension 44 and on to further treatment. Any excess of liquid in the test-tube 41 over that conducted through the conduit 34 can overflow through fitting 35, elbow 37 and through pipe 39 to discharge as at 40.

The stem or tube 31 with its terminal bulb 30 is inserted in the tube 29 for restricting the flow to the gooseneck 33 which promotes smoothness of operation. The entire apparatus operates at atmospheric pressure, and continuously. The non-volatilized constituents are removed from the vaporizer or boiler zone of pipe 19 by being collected in a body of liquid, and automatically overflowed therefrom at a point functionally remote from the vaporizer zone and in quantity equal to that received by the body. When the apparatus is used in the recovery or removal of HCl from a suitable solution thereof, steam is supplied to the steam jacket 22 at about 50 pounds pressure per sq. in. or approximately at a temperature of 147° C. By the use of this apparatus and method, the desired end product may be either the concentrated distillate solution 63 or the liquid containing the non-volatilized constituents overflowing the gooseneck 33, depending upon what liquid is being treated, or possibly both may be made use of.

In the concentration of a complex dilute HCl solution, experience has shown that a carefully controlled concentrated solution can be obtained that comprises 35% HCl and 65% $H_2O$ (both by weight). Practically any dilution of starting mixture can be used while still attaining this concentration of HCl in the end product, provided the rate of feed of the starting mixture to the apparatus is carefully controlled and made slow enough, provided the HCl is evolved with a sufficient degree of selectivity from the solution being treated. Indeed, by controlling the rate of feed, an end product solution has been obtained having HCl in a range from 30% to saturation. By heating the vaporizer zone to a temperature of approximately 147° C., an end product solution of HCl has been obtained wherein the HCl ranges from 32% to 37%. In this method of treatment, the vertical vaporizer or boiler tube and the vertical condenser tube seem to comprise important features.

So that the type of complex solution or liquid that is treatable by this invention may be understood, it may be pointed out that the complex or perhaps triplex liquid must contain a solvent, a solute and at least a third constituent, of which during distillation at the temperatures used, volatilization of the third constituent is minimized, volatilization of the solute is maximized, while volatilization of the solvent is selective and controllable between the other two. This invention teaches how to control the ratio of the volatilized solvent to the volatilized solute and thus the concentration of the yielded solution. This control is accomplished by the rate of feed to the apparatus.

The apparatus has proved efficient in treating a mixture of coniferous resins with a concentrated solution of sulfur dioxide in benzene for recovering a concentrated solution of $SO_2$ suitable for treating a further quantity of such resins. Another example is the recovery of a concentrated aqueous solution of ammonia from a suitably treated aqueous solution of ammonium chloride. Still another example relates to the manufacture of phosphorous acid by the treatment of phosphorus trichloride with an aqueous solution of hydrochloric acid. Phosphorous acid is yielded contaminated with HCl. This mixture when treated in the apparatus of this invention, yielded a distillate solution of HCl and water, containing 30.9% HCl which distillate was suitable for re-use in the initial reaction.

I claim:

1. The process of recovering a distillate containing a solute in controlled concentration from a complex starting liquid having a solvent, a solute and at least a third constituent less volatile than both the solvent and solute, which comprises maintaining an ever-changing body of such liquid in a vaporizing zone heated to a temperature lying within a range at which solute selectively volatilizes from its solvent, continually passing volatilized vapors from the vaporizing zone through a condensing zone, continuously in-feeding the starting liquid at a controlled rate into the vaporizing zone at an elevation above the liquid body therein whereby the feed liquid flows downwardly to reach and collect in the liquid body, continually recovering from the condensing zone a distillate whose concentration of the volatilized solute is controlled by the rate at which the starting liquid is fed to the vaporizing zone, and continually removing from the liquid body a quantity of residual liquid including a quantity of the third constituent by out-flowing liquid from the bottom of the liquid body and then upwardly over a high point that determines the liquid level in the vaporizing zone whereby flow to, through and from the liquid body is progressively in a uni-flow direction.

2. The process according to claim 1, wherein the starting liquid is fed first downwardly into a column of such liquid and upwardly through another column of such liquid balancing the first column and then from a high point of the second column into the vaporizing zone at an elevation above the liquid level of that zone.

3. The process according to claim 1, wherein the removed out-flowed liquid is accumulated into a pool thereof, and sucking liquid from that pool for further treatment.

4. The process of recovering a concentrated solution of HCl from a complex starting liquid having HCl in aqueous solution and a less volatile third constituent, which comprises maintaining an ever-changing body of such liquid in a vaporizing zone heated to a temperature lying within a range at which HCl selectively volatilizes from its aqueous solution, continually passing volatilized HCl from the vaporizing zone through a condensing zone, continuously in-feeding the starting liquid at a controlled rate into the vaporizing zone at an elevation above the liquid body therein whereby the feed liquid flows downwardly to reach and collect in the liquid body, continually recovering from the condensing zone a distillate whose concentration of the HCl is controlled by the rate at which the starting liquid is fed to the vaporizing zone, and continually removing from the liquid body a quantity of residual liquid including a quantity of the third constituent by out-flowing liquid from the bottom of the liquid body and then upwardly over a high point that determines the liquid level in the vaporizing zone whereby flow to, through and from the liquid body is progressively in a uni-flow direction.

5. The process according to claim 4, wherein the third constituent in the starting material is $HClO_4$ and which is removed from the vaporizing zone with the residual liquid.

JOHN C. PERNERT.